Patented Aug. 4, 1953

2,647,921

UNITED STATES PATENT OFFICE 2,647,921

TELOMERIC POLYCARBOCYCLIC OXOESTERS

Tracy M. Patrick, Jr., Dayton, Ohio, assignor to Monsanto Chemical Company, St. Louis, Mo., a corporation of Delaware No Drawing. Application December 9, 1950, Serial No. 200,102

9 Claims. (Cl. 260—483)

This invention relates to a novel process for the preparation of telomeric polycarbocyclic oxoesters comprising the reaction of sautrated aldehydes with alicyclic and aromatic esters of a 4 to 6 carbon atom $\alpha,\beta$-ethylenic unsaturated polycarboxylic acid selected from the group consisting of maleic acid, fumaric acid, citraconic acid, mesaconic acid, aconitic acid and glutaconic acid, in the presence of a free radical promoting agent and to the telomeric products produced thereby.

The definitions pertaining to "telomers" and "telomerization" are to be found in U. S. Patent 2,440,800, wherein said terms were defined so as to provide adequate means for distinguishing reactions such as those as herein disclosed from conventional polymerization reactions.

It has now been found that telomeric polycarbocyclic oxoesters can be prepared by reacting a saturated aldehyde with a carbocyclic ester, partial ester, or mixed ester of a 4 to 6 carbon atom $\alpha,\beta$-ethylenic unsaturated polycarboxylic acid, selected from the group consisting of maleic acid, fumaric acid, citraconic acid, mesaconic acid, aconitic acid and glutaconic acid, and mixtures thereof in the presence of a free radical promoting agent.

The telomeric compositions of this invention can be diagrammatically represented by the structural formula

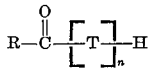

wherein R is a saturated radical containing up to 17 and preferably up to 7 carbon atoms selected from the group consisting of alkyl, cycloalkyl and heterocyclic radicals, T is a taxomon of the aforementioned mono-ethylenic unsaturated polyesters and $n$ is an integer greater than 1.

Where the polycarboxylic acids are substantially completely esterified with a single carbocyclic alcohol the taxomons can be represented by

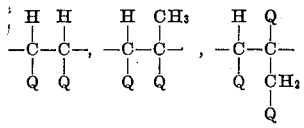

and

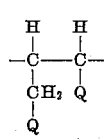

wherein Q represents the radical —COOR' and R' is a 3 to 20 and preferably a 3 to 8 carbon atom saturated carbocyclic radical. The telomeric composition could thus be represented

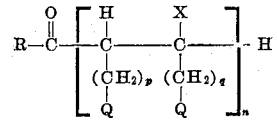

wherein X is selected from the group consisting of —H, —CH₃ and Q; the sum of $p$ and $q$ is an integer from 0 to 1; and R, Q and $n$ are as defined above. In general, $n$ is an integer and can range from about 2 to about 20 and preferably from about 2 to about 5 for an isolated telomer. However, the mixed telomeric compositions are suitable for most purposes without separation into their component parts, thus the average value of $n$ will generally be a mixed number greater than 2.

The carbocyclic esters of the aforementioned 4 to 6 carbon atom $\alpha,\beta$-ethylenic unsaturated polycarboxylic acids can be mono-, di-, and triesters and can also be mixed esters. The 3 to 20 carbon atom saturated carbocyclic ester radicals can be selected from the group consisting of aryl, alkaryl, aralkyl and cycloalkyl radicals, as for example, phenyl, biphenylyl, naphthyl, tolyl, xylyl, mesityl, cumyl, benzyl, phenethyl, cyclopropyl, cyclohexyl, bicyclohexylyl, tetrahydronaphthyl, decahydronaphthyl, tetrahydroabietyl, dehydroabietyl and the like and mixtures thereof. Thus, esters, partial esters and mixed esters of the aforementioned acids can be, for example, phenyl hydrogen maleate, benzyl hydrogen maleate, cyclohexyl hydrogen maleate, dehydroabietyl hydrogen maleate, tetrahydroabietyl hydrogen maleate, diphenyl maleate, ditolyl maleate, dibenzyl maleate, diphenethyl maleate, dicyclopropyl maleate, dicyclobutyl maleate, dicycloamyl maleate, dicyclohexyl maleate, phenyl benzyl maleate, phenyl cyclohexyl maleate, phenethyl cycloamyl maleate and the like. Whereas the foregoing examples are limited to maleates, it will be readily understood that similar compounds of fumarates, citraconates, mesaconates, aconitates and glutaconates can be employed.

From the above it will be apparent that by the term "saturated carbocyclic radical" the conventional exception is made for normal benzene-ring unsaturation since benzene does not give any reaction with bromine water and practically all of its reactions are those of substitution instead of addition.

When the aldehyde reacts with the unsaturated polycarboxylic acid or partial ester such that the carbon atom with which the acyl group forms a new carbon-carbon bond also has a carboxyl radical attached thereto the compound so formed is in general unstable, evolving carbon dioxide from the carboxyl radical. When the carboxyl group is esterified, prior to the reaction with the aldehyde, decarboxylation does not occur. Thus in the process of this invention the substantially completely esterified acids are preferably employed. Further it is generally preferable that the ester groups be identical since it is not economical to esterify preferentially the polycarboxylic acid with mixed alcohols to obtain substantially homogeneous products.

The saturated aldehydes can be selected from the group consisting of aliphatic, alicyclic and heterocyclic aldehydes, as for example, ethanal, propanal, butanal, pentanal, hexanal, heptanal, octanal, nonanal, decanal, dodecanal, tetradecanal, hexadecanal, octadecanal, 2-ethylhexanal, hexahydrobenzaldehyde, tetrahydrofurfural and the like. The saturated aliphatic aldehydes are preferred.

The term "free radical promoting agent" as used herein embraces ultraviolet radiation and free radical promoting catalysts. The free radical promoting catalysts are, for example, acetyl peroxide, t-butyl peroxide, t-butyl hydroperoxide, benzoyl peroxide, lauroyl peroxide, stearoyl peroxide, hydrogen peroxide, peracetic acid, sodium perborate, potassium persulfate and the like. The free radical promoting catalyst is generally employed at from about 0.1 to about 5 mole per cent and preferably from about 0.25 to about 2 mole per cent based on the carbocyclic esters of the 4 to 6 carbon atom $\alpha,\beta$-ethylenic unsaturated polycarboxylic acid; and the catalyst may be added all at once, in increments or continuously over a period of time.

The temperature at which the reaction is maintained is not critical. The temperature may range from $-50°$ C. to the decomposition point of the reactants but the range of from about $25°$ C. to about $100°$ C. is preferred. In general the temperature should be selected such that the free radical promoting catalyst is decomposed at a moderate rate during the course of the reaction, for example, if benzoyl peroxide is the free radical promoting catalyst a temperature in the range of from about $70°$ C. to about $90°$ C. is preferred.

The pressure should preferably be sufficient to maintain the reactants in a liquid state during the reaction, thus relatively volatile reactants should be processed in a pressure vessel. In general, however, a reaction vessel equipped with a reflux condenser is suitable for most reactants.

The mole ratio of the aldehyde to the $\alpha,\beta$-ethylenic polyester can vary over a wide range, e. g., from about 5:1 to about 1:5 although ratios outside these limits are operable. In general it is preferable to have a molar excess of the polyester in order to obtain more favorable yields of telomer.

The reaction can be brought about by the direct mixing of the reactants as shown in the examples below or can be brought about in the presence of an inert organic solvent, e. g., benzene, cyclohexane, hexane and the like, or the aldehyde can be added stepwise to the polyester throughout the course of the reaction. Proper agitation, e. g., refluxing, stirring, rocking, or passing an inert gas through the system, should be maintained to provide adequate mixing of the reactants.

The following examples are illustrative of the invention:

Example 1

A 140.2-g. sample (0.5 mole) of dicyclohexyl maleate and 108 g. (1.5 moles) of redistilled n-butanal were added to a 500-ml. round-bottomed flask. The flask was fitted with a reflux condenser and a thermometer and was supported by an electric heating mantle. The mixture of ester and aldehyde was heated to reflux ($85.0°$ C.) at which time 1.0 g. of benzoyl peroxide was added and refluxing continued. After 5 hours the reflux temperature had risen to $91.3°$ C. At this time an addition 0.2 g. of benzoyl peroxide was added and refluxing continued. After a total reaction time of 21 hours the reflux temperature was $91.8°$ C. and the heating was discontinued. The medium amber liquid was then fractionally distilled to recover the excess n-butanal and any unreacted dicyclohexyl maleate. The principal product obtained in a yield of 83 per cent (146.5 g.) was a deep yellow liquid boiling at 178 to $185°$ C. at 1 mm. (mostly $180°$ C. at 1 mm.) having a refractive index of 1.4728 at $25°$ C. and a density $$\left(\tfrac{25}{25}\right)$$

of 1.0475. The product was identified as dicyclohexyl butyrylsuccinate.

Calculated for $C_{20}H_{32}O_5$: C, 68.15; H, 9.15. Found: C, 68.08; H, 9.01.

A residue (22.8 g.) of a dark amber viscous liquid telomeric product of n-butanal and dicyclohexyl maleate was also obtained.

Example 2

A 98.8-g. sample (0.33 mole) of redistilled dibenzyl maleate and 72 g. (1.0 mole) of redistilled n-butanal were added to a 500-ml. round-bottomed flask equipped as in Example 1. The mixture was brought to reflux ($84.2°$ C.) at which time 0.5 g. of benzoyl peroxide was added. The refluxing was continued for 16 hours after which time the reflux temperature was $93°$ C. and heating was discontinued. The dark amber liquid was distilled to recover the excess n-butanal and any unreacted dibenzyl maleate. The residue was an amber viscous liquid. This residue was further distilled to obtain 96.2 g. (78% yield of a deep yellow liquid boiling at about $215°$ C. at 1 mm. and having a refractive index of 1.5268 at $25°$ C. and a density $$\left(\tfrac{25}{25}\right)$$

of 1.1209. The product was identified as dibenzyl butyrylsuccinate.

Calculated for $C_{22}H_{24}O_5$: C, 71.71; H, 6.56. Found: C, 71.59; H, 6.46.

A residue (18 g.) of a brown viscous liquid telomeric product was also obtained.

Other telomeric compositions can be prepared by reacting, for example,

Ethanal with dicyclohexyl maleate,
n-Heptanal with diphenethyl maleate,
n-Butanal with diphenyl maleate,
n-Heptanal with dicyclohexyl maleate,
n-Butanal with tricyclohexyl aconitate and the like in a similar manner to that disclosed in the above illustrative examples.

The novel telomeric compositions of this invention are useful as lubricants, lubricant additives, softeners for synthetic rubber, wax composition additives and anti-foam agents.

This application is a continuation-in-part of my copending application Serial Number 170,046, filed June 23, 1950.

I claim:

1. The telomeric composition

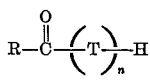

wherein R is a saturated hydrocarbon radical containing up to 17 carbon atoms, T is a divalent radical selected from the group consisting of

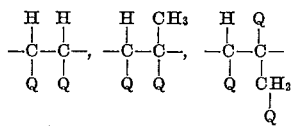

and

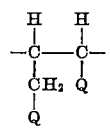

wherein Q is the radical —COOR' and R' is a saturated carbocyclic hydrocarbon radical, free from non-benzenoid unsaturation, containing up to 20 carbon atoms, and $n$ is an integer from 2 to 20.

2. The telomeric composition

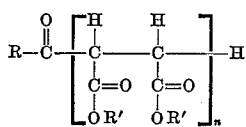

wherein R is an alkyl radical containing up to 17 carbon atoms, R' is a saturated carbocyclic hydrocarbon radical, free from non-benzenoid unsaturation, containing up to 20 carbon atoms, and $n$ is an integer from 2 to 20.

3. The telomeric composition

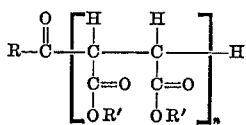

wherein R is an alkyl radical containing up to 7 carbon atoms, R' is a saturated carbocyclic hydrocarbon radical, free from non-benzenoid unsaturation, containing up to 8 carbon atoms and $n$ is an integer from 2 to 5.

4. The telomeric composition of claim 3 wherein R is an n-propyl radical and R' is a cyclohexyl radical.

5. The telomeric composition of claim 3 wherein R is an n-propyl radical and R' is a benzyl radical.

6. The telomeric composition of claim 3 wherein R is a methyl radical and R' is a cyclohexyl radical.

7. The telomeric composition of claim 3 wherein R is an n-hexyl radical and R' is a phenethyl radical.

8. The telomeric composition

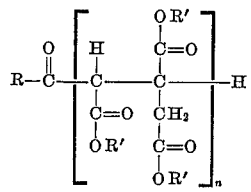

wherein R is an alkyl radical containing up to 7 carbon atoms, R' is a saturated carbocyclic hydrocarbon radical, free from non-benzenoid unsaturation, containing up to 8 carbon atoms and $n$ is an integer from 2 to 5.

9. The telomeric composition of claim 8 wherein R is an n-propyl radical and R' is a cyclohexyl radical.

TRACY M. PATRICK, Jr.

No references cited.